(12) United States Patent
Karan (10) Patent No.: US 12,465,243 B2
(45) Date of Patent: Nov. 11, 2025

(54) METHOD TO FACILITATE THE COLLECTING AND PRESERVING OF A SPECIMEN

(71) Applicant: Aharon A. Karan, Glendale, WI (US)

(72) Inventor: Aharon A. Karan, Glendale, WI (US)

(73) Assignee: Kenco Label & Tag Co., LLC, Milwaukee, WI (US)

( * ) Notice: Subject to any disclaimer, the term of this patent is extended or adjusted under 35 U.S.C. 154(b) by 227 days.

(21) Appl. No.: 17/009,270

(22) Filed: Sep. 1, 2020

(65) Prior Publication Data

US 2022/0061703 A1 Mar. 3, 2022

(51) Int. Cl.
  *A61B 5/1172* (2016.01)
(52) U.S. Cl.
  CPC .................. *A61B 5/1172* (2013.01)
(58) Field of Classification Search
  CPC .............. A61B 5/1172; A61B 10/0038; A61B 5/150343; G01N 2001/028; G01N 33/525; G01N 33/726; G01N 27/622; G01N 33/52; G01N 1/00–44; G01N 2001/002–4094; G01N 35/00029; G01N 2035/00039; G01N 1/2202; G01N 1/312; G01N 35/00039; G01N 2035/00138; G01N 2001/2826; G01N 2001/2833; B32B 7/06; B32B 7/12; B32B 7/00–14; B32B 2307/58; B32B 2307/582; B42D 25/313; B42D 25/47; B42D 2033/40; B42D 15/00–085; Y10S 428/916; Y10T 156/1051; Y10T 156/1082; Y10T 436/112499; Y10T 428/28; Y10T 436/2525; B65D 27/16; B65D 73/0078–0092; B65D 75/20; B65D 27/00–38; B65D 73/00–02; B65D 75/00–70; A61J 1/03; A61J 1/033; B01L 3/5023; B01L 2200/10; B01L 2300/0822; B01L 3/5055; B01L 3/00–569; B01L 3/505; B01L 3/50–5088; G06V 40/12–1394; G06V 40/00–12; B65B 27/16; G09F 3/00–208; G09F 2003/0201–0285; G06K 19/00–18; A45C 13/00–42; G06F 21/32

See application file for complete search history.

(56) References Cited

U.S. PATENT DOCUMENTS

| | | |
|---|---|---|
| 5,373,656 A | 12/1994 | Merser |
| 5,560,657 A | 10/1996 | Morgan |
| 5,799,425 A | 9/1998 | Merser et al. |
| 5,826,775 A | 10/1998 | Mooney et al. |
| 6,694,653 B2 | 2/2004 | Bradfield et al. |
| 8,381,991 B2 | 2/2013 | Atherton |

(Continued)

*Primary Examiner* — Chanh D Nguyen
*Assistant Examiner* — Aaron Midkiff
(74) *Attorney, Agent, or Firm* — Boyle Fredrickson, S.C.

(57) ABSTRACT

A method is provided to facilitate the collecting and preserving a piece of physical evidence. The method includes the steps of providing a collection card with inner and outer layers laminated to each other and removing a first portion of the inner layer to expose an adhesive on a first portion of the outer layer. The piece of physical evidence is positioned between a second portion of the inner layer and the first portion of the outer layer. Thereafter, the first portion of the outer layer is folded over the second portion of the inner layer so as to capture the piece of physical evidence therebetween.

13 Claims, 6 Drawing Sheets

(56) References Cited

U.S. PATENT DOCUMENTS

| | | |
|---|---|---|
| 10,255,830 B2 | 4/2019 | Karan |
| 10,565,901 B2 | 2/2020 | Karan |
| 2001/0022280 A1 | 9/2001 | Kannabiran et al. |
| 2005/0178037 A1 | 8/2005 | Kunreuther |
| 2008/0048030 A1 | 2/2008 | Garner |
| 2009/0121010 A1 | 5/2009 | Ireland et al. |
| 2010/0136208 A1* | 6/2010 | Zarate .................... B42D 15/00 118/31.5 |
| 2010/0288059 A1* | 11/2010 | Viljoen .............. A61B 10/0096 73/864.51 |
| 2011/0031148 A1 | 2/2011 | Rosendall et al. |
| 2012/0304600 A1* | 12/2012 | Bellmyer ........... B65D 73/0078 53/461 |
| 2013/0341901 A1* | 12/2013 | Staymates ............ G01N 27/622 283/78 |
| 2014/0234891 A1* | 8/2014 | Mao ........................ G01N 1/10 435/307.1 |
| 2016/0220992 A1* | 8/2016 | Lewis ................... B01L 3/5055 |
| 2017/0205406 A1* | 7/2017 | Horton .................. B01L 3/5055 |
| 2021/0005289 A1* | 1/2021 | Graham ................ G16H 10/20 |

* cited by examiner

METHOD TO FACILITATE THE COLLECTING AND PRESERVING OF A SPECIMEN

FIELD OF THE INVENTION

This invention relates generally to the collecting and preserving of a specimen, and in particular, to a method to facilitate the collecting and preserving of a specimen, such as evidence from a crime scene, wherein the tampering or altering thereof is evident.

BACKGROUND AND SUMMARY OF THE INVENTION

As is known, when a crime is committed, a team of law enforcement professionals will conduct a thorough, coordinated investigation of the crime scene to collect all probative evidence. It can be appreciated that the collection and preservation of physical evidence from a crime scene is vital for law enforcement professionals for future evaluation of the crime. However, it is not unusual for physical evidence to be compromised during prior to or during the course of the investigation. For example, biological evidence can be destroyed or damaged easily by weather conditions or inadvertently contaminated by individuals examining the crime scene. As such, in order to the maintain the integrity of any investigation, the physical evidence must be preserved in such a manner as to prevent the tampering therewith, while simultaneously maintaining the characteristics of the physical evidence over an indefinite period of time. It can be understood that a successful investigation of a crime may be dependent upon on the physical evidence collected at the time of the initial crime scene investigation.

Fingerprints are one type of physical evidence often collected at a crime scene. At a crime scene, a law enforcement professional will use adhesive powders to find fingerprints. More specifically, a law enforcement professional will use a brush to dust various surfaces with a powder that sticks to the oils present in fingerprints, thereby rendering the fingerprints visible. After locating a fingerprint on a surface, a law enforcement professional photographs the fingerprint, and then, lifts the fingerprint from the surface using a special lifting tape. The lifting tape is applied to the surface wherein the fingerprint is visible such that the powder adheres to the lifting tape. The lifting tape is removed from surface with the powder adhered thereto. Thereafter, the lifting tape is is affixed to a piece of paper of a color (e.g. white paper) that contrasts with color of the powder (e.g. black), thereby providing a documentary record of the fingerprint.

With respect to physical evidence such as hairs and fibers, a law enforcement professional may use tweezers to capture and collect the hair or fiber. Thereafter, the hair or fiber may be transferred to a sealed container for future processing. However, given the physical characteristics hair and fibers, it is not unusual for a hair or fiber to become damaged or lost during processing during the collection and storage thereof. Alternatively, hair or fibers may be collected by a law enforcement professional using lifting tape. The lifting tape may be applied to the surface wherein the hair or fibers are located such that the hair or fibers adhere to the lifting tape. The lifting tape is removed from surface with the hair or fibers adhered thereto, and thereafter, are affixed to a piece of paper to preserve the hair or fibers for future analysis.

While functional for their intended purpose, the use of lifting tape and paper by law enforcement professionals can be burdensome and requires the user to have both materials, a roll of lifting tape and a stack of paper evidence card, on hand to collect and preserve the physical evidence. Further, the use of sample containers to collect and store the physical evidence, such as hair and fibers, may result in the physical evidence become damaged or lost during processing during the collection and storage thereof. Further, since the physical evidence collected is simply retained in a container, cross-contamination of and/or the tampering with the physical evidence is possible.

In view of the foregoing, it is primary object and feature of the present invention to provide a method to facilitate the collecting and preserving of a specimen wherein the tampering or altering thereof is evident.

It is a further object and feature of the present invention to provide a method to facilitate the collecting and preserving of a specimen that is simple and easy to practice by individuals, such as law enforcement professionals.

It is a further object and feature of the present invention to provide a device to facilitate the collecting and preserving of a specimen that is simple and inexpensive to manufacture.

In accordance with the present invention, a method is provided to facilitate the collecting and preserving a specimen. The method includes the steps of providing a collection card with inner and outer layers laminated to each other and removing a first portion of the inner layer to expose an adhesive on a first portion of the outer layer. The specimen is positioned between a second portion of the inner layer and the first portion of the outer layer. The first portion of the outer layer is folded over the second portion of the inner layer so as to capture the specimen therebetween.

The adhesive may be provided on first portion of the outer layer adjacent an outer periphery thereof so as to define a boundary of an adhesive-free area on the first portion of the outer layer. The adhesive-free area on the first portion of the outer layer and the second portion of the inner layer define a pocket therebetween when the first portion of the outer layer is folded over the second portion of the inner layer. The pocket adapted for receiving the specimen therein. The second portion of the inner layer is also bound to the second portion of the outer layer by the adhesive. The first portion of the inner layer has a non-binding layer of material affixed thereto. The material may be one of silicone and wax.

The method may include the additional step of removing a portion of the collection card including a portion of the specimen captured between the first portion of the outer layer and the second portion of the inner layer from the collection card to allow for analysis on the portion of the piece of physical evidence. The step of positioning of the specimen between the second portion of the inner layer and the first portion of the outer layer includes the additional steps of affixing the first portion of the outer layer to a surface over a powder adhered to a fingerprint on the surface such that the powder adheres to the first portion of the outer layer; and removing the first portion of the outer layer from the surface with the powder adhered thereto.

In accordance with a further aspect of the present invention, a method is provided to facilitate the collecting and preserving a specimen including the step of providing a collection card moveable between a first configuration wherein the collection card is generally flat and a second configuration. The collection card has inner and outer layers laminated to each other. A first portion of the inner layer is removed to expose an adhesive on at least a portion of a first portion of the outer layer. The specimen is positioned between a second portion of the inner layer and the first portion of the outer layer. The collection card is folded to a second configuration wherein first portion of the outer layer is adjacent the second portion of the inner layer so as to capture the specimen therebetween.

The adhesive may be provided adjacent an outer periphery of the first portion of the outer layer so as to define a boundary of an adhesive-free area on the first portion of the outer layer. The adhesive-free area on the first portion of the outer layer and the second portion of the inner layer define a pocket therebetween with the collection card in the second configuration. The pocket is adapted for receiving the specimen therein. The second portion of the inner layer is bound to the second portion of the outer layer by the adhesive. The first portion of the inner layer has a non-binding layer of material affixed thereto. The material may be one of silicone and wax.

The method may include the additional step of removing a portion of the collection card including a portion of the specimen captured between the first portion of the outer layer and the second portion of the inner layer from the collection card to allow for analysis on the portion of the specimen. The specimen between the second portion of the inner layer and the first portion of the outer layer includes the additional steps of affixing the first portion of the outer layer to a surface over a powder adhered to a fingerprint on the surface such that the powder adheres to the first portion of the outer layer; and removing the first portion of the outer layer from the surface with the powder adhered thereto.

In accordance with a still further aspect of the present invention, a method is provided to facilitate the collecting and preserving a piece of physical evidence. The method includes the steps of providing a collection card with inner and outer layers laminated to each other and removing a first portion of the inner layer of the collection card to expose a first portion of the outer layer. The piece of physical evidence may be positioned between a second portion of the inner layer and the first portion of the outer layer and the piece of physical evidence is captured between a second portion of the inner layer and the first portion of the outer layer.

An adhesive may be provided on at least a portion of the first portion of the outer layer. A non-binding layer of material may be affixed to the inner surface of the second portion of the inner layer. The material may be one of silicone and wax. The adhesive may be provided adjacent an outer periphery of the first portion of the outer layer so as to define a boundary of an adhesive-free area on the first portion of the outer layer. The step of capturing the piece of physical evidence between the second portion of the inner layer and the first portion of the outer layer includes the step of folding the first portion of the outer layer over the second portion of the inner layer such that the adhesive-free area on the first portion of the outer layer and the second portion of the inner layer define a pocket therebetween, the pocket adapted for receiving the piece of physical evidence therein.

A portion of the collection card including a portion of the piece of physical evidence captured between the second portion of the inner layer and the first portion of the outer layer may be removed to allow for analysis on the portion of the piece of physical evidence. The step of positioning the piece of physical evidence between the second portion of the inner layer and the first portion of the outer layer includes the additional steps of affixing the first portion of the outer layer to a surface over a powder adhered to a fingerprint on the surface such that the powder adheres to the first portion of the outer layer; and removing the first portion of the outer layer from the surface with the powder adhered thereto.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
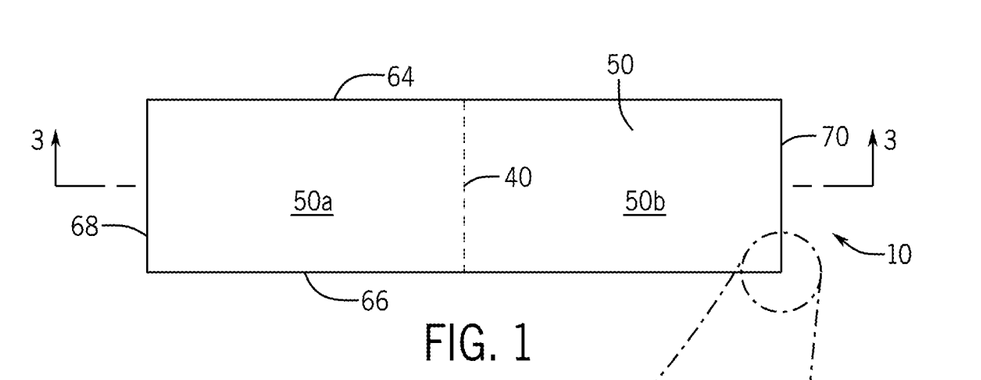
FIG. 1 is top plan view of a collection card in accordance with the present invention in an initial configuration.
Figure 2:
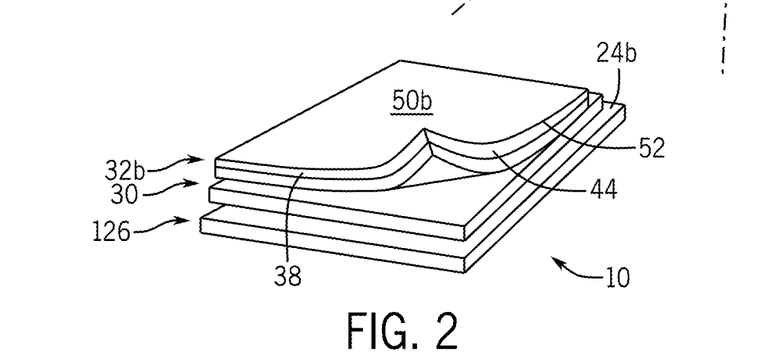
FIG. 2 is an enlarged isometric view showing the layers of the collection card of FIG. 1.
Figure 3:
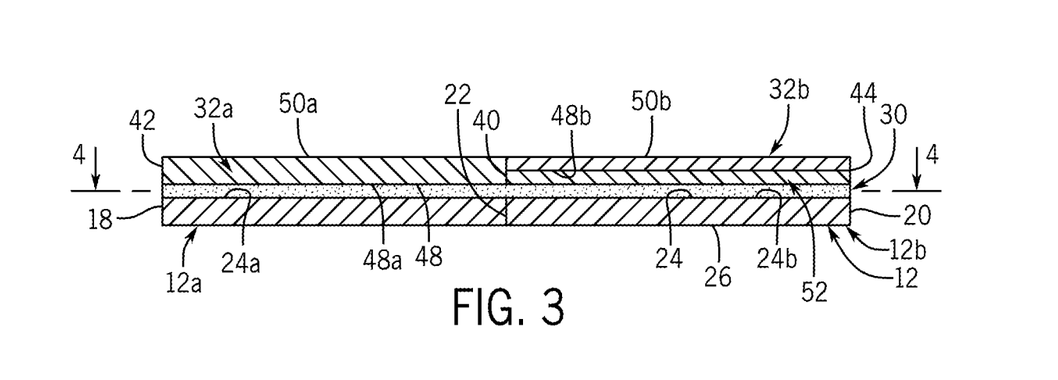
FIG. 3 is a cross-sectional view of the collection card of the present invention taken along line 3-3 of FIG. 1.
Figure 4:
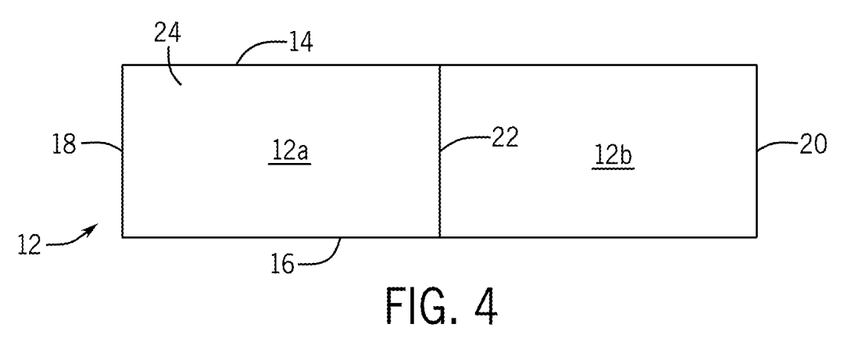
FIG. 4 is a cross-sectional view of the collection card of the present invention taken along line 4-4 of FIG. 3.

Referring to FIGS. 1-14, a tamper evident collection card, which allows for the tampering and/or altering of the collection card to be detected, is generally designated by the reference numeral 10. As best seen in FIGS. 3-4, collection card 10 includes a first outer transparent layer 12 formed from a generally clear or transparent material. Transparent layer 12 is defined by first and second spaced edges 14 and 16, respectively, and first and second spaced ends 18 and 20, respectively. A fold line 22 is transverse to first and second edges 14 and 16, respectively, at location generally equidistant from first and second ends 18 and 20, respectively. Fold line 22 is generally parallel to first and second ends 18 and 20, respectively, and divides transparent layer 12 into first and second portions 12a and 12b, respectively. In the depicted embodiment, transparent layer 12 has a generally rectangular configuration. However, other configurations are possible without deviating from the scope of the present invention.

Transparent layer 12 further includes an inner surface 24 and an outer surface 26. It is contemplated for first portion 24a of inner surface 24 associated with first portion 12a of transparent layer 12 to have a surface area approximately equal to the surface area of second portion 24b of inner surface 24 associated with second portion 12b of transparent layer 12. It is contemplated for outer surface 26 of transparent layer 12 to define a printable surface so as to allow desired information to be printed or written thereon. In a first configuration, adhesive 30 is provided on and is affixed to the entirety of inner surface 24 of the transparent layer 12, for reasons hereinafter described.

Figure 5:
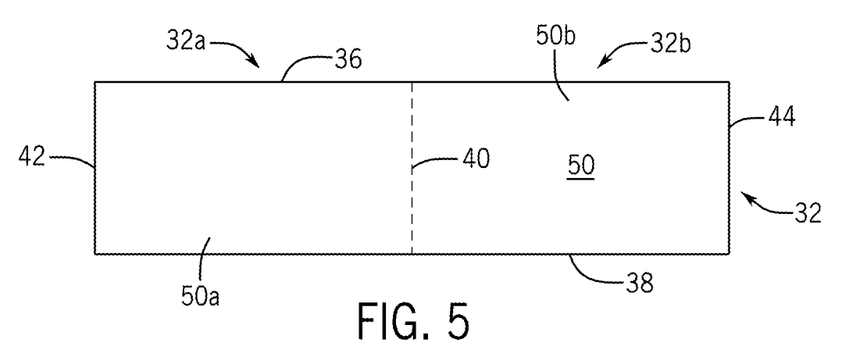
FIG. 5 is a top plan view of a top layer of the collection card of FIG. 1.
Figure 6:
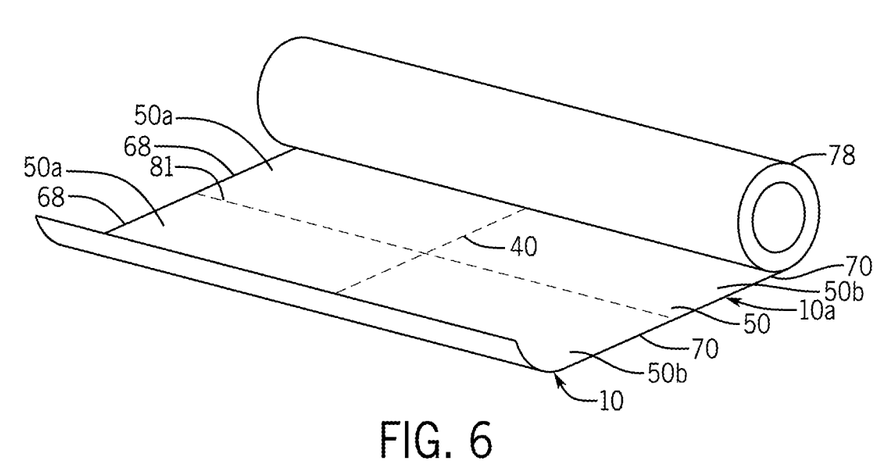
FIG. 6 is an isometric view of a rolled sheet of collection cards in accordance with the present invention.
Figure 7:
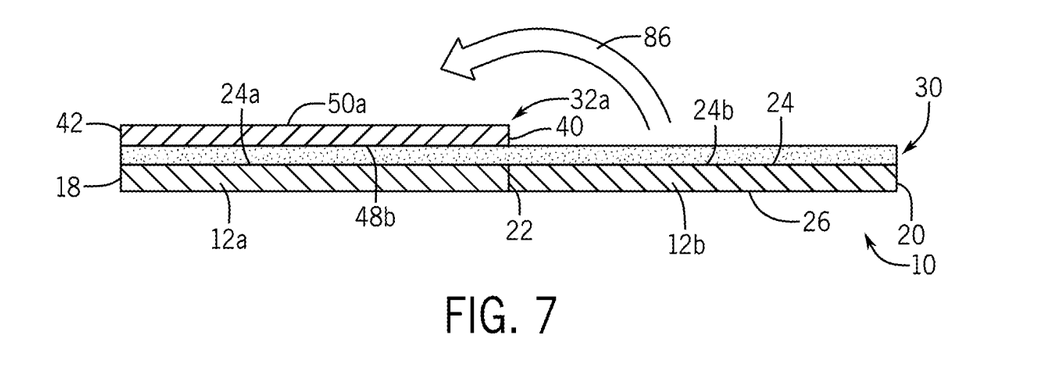
FIG. 7 is cross-sectional view of the collection card of the present invention, similar to FIG. 3, having a first portion of the top layer removed.
Figure 8:
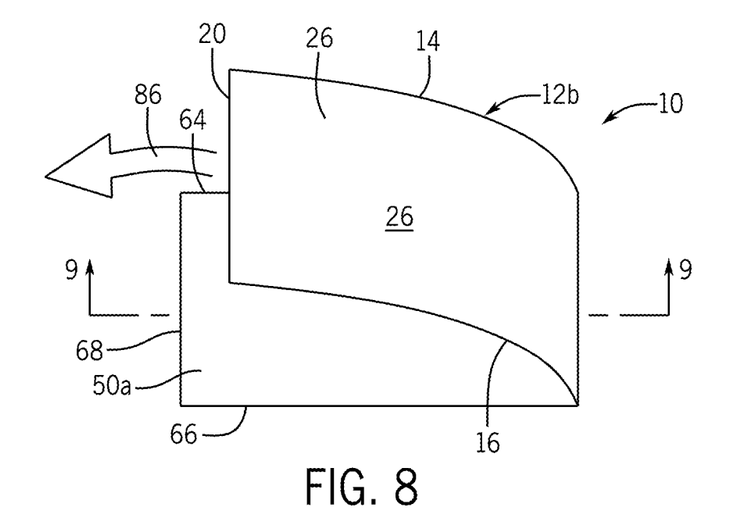
FIG. 8 is an isometric view of the collection card of FIG. 7 being folded into a second configuration.
Figure 9:
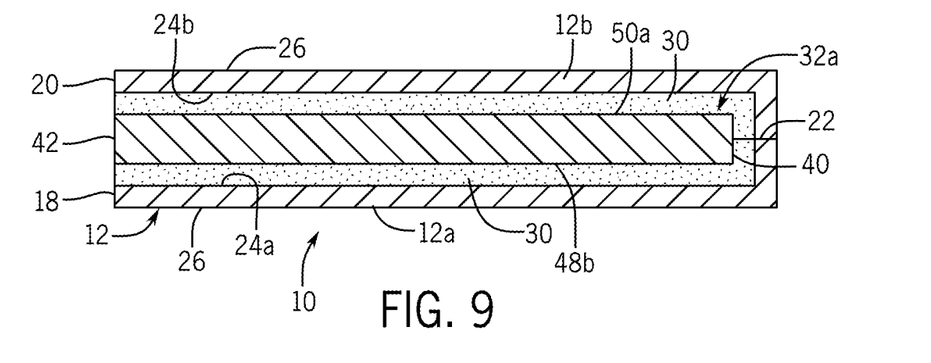
FIG. 9 is a cross-sectional view of the collection card of the present invention taken along line 9-9 of FIG. 8 showing the collection card in the second configuration.
Figure 10:
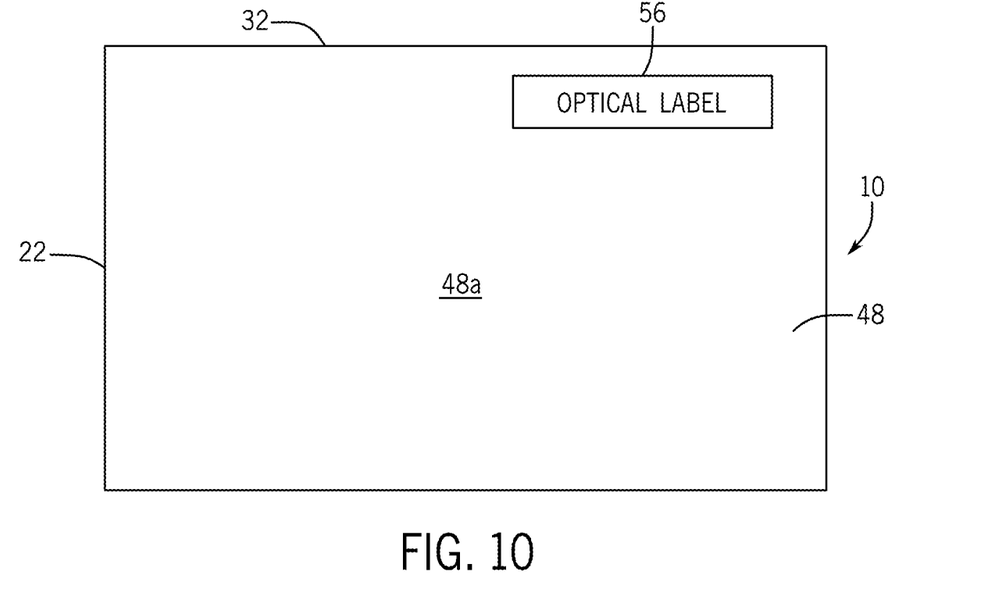
FIG. 10 is a rear elevational view of the collection card of the present invention in the second configuration.

As best seen in FIGS. 3 and 5, substrate 32 is positioned over transparent layer 12. Substrate 32 includes first and second spaced edges 36 and 38, respectively, and first and second spaced ends 42 and 44, respectively. A scored or perforated line 40 is transverse to and first and second edges 36 and 38, respectively, at a location generally equidistant from first and second ends 42 and 44, respectively. Perforated line 40 is generally parallel to first and second ends 42 and 44, respectively, and divides substrate 32 into first and second portions 32a and 32b, respectively.

Substrate 32 further includes an inner surface 48 and an outer surface 50. It is contemplated for a first portion 48a of inner surface 48 of substrate 32 associated with first portion 32a of substrate 32 to have a surface area approximately equal to the surface area of first portion 24a of inner surface 24 of transparent layer 12 and for a second portion 48b of inner surface 48 of substrate 32 associated with second portion 32b of substrate 32 to have a surface area generally equal to the surface area of second portion 24b of inner surface 24 of transparent layer 12. Silicone 52 or other non-binding material, e.g., wax or Teflon, is bonded to second portion 48b of inner surface 48 of substrate 32, for reasons hereinafter described. As described, substrate 32 has a generally rectangular configuration. However, other configurations are possible without deviating from the scope of the present invention.

It is contemplated for inner surface 48 and/or outer surface 50 of substrate 32 to be a printable surface so as to allow desired information to be printed thereon. Similar to inner surface 48 of substrate 32, outer surface 50 of substrate 32 has first and second portions 50a and 50b, respectively. It is contemplated to print any desired information on first portion 48a of inner surface 48 of substrate 32 and/or on first portion 50a of outer surface 50 of substrate 32 to facilitate the tracking of collection card 10. More specifically, a machine-readable optical label, designated by the reference number 56, FIG. 10, such as a barcode, a matrix code, a quick response code, and a unique alphanumeric code, may be printed on first portion 48a of inner surface 48 of substrate 32 and/or on first portion 50a of outer surface 50 of substrate 32, as well as, other types of unique identifiers, such as a card number may printed on first portion 48a of inner surface 48 of substrate 32 and/or on first portion 50a of outer surface 50 of substrate 32.

First portion 48a of inner surface 48 of substrate 32 is aligned with and positioned against the adhesive 30 bonded to first portion 24a of inner surface 24 of transparent layer 12 so as to bond first portion 32a of substrate 32 to first portion 12a of transparent layer 12. It is intended for the adhesive 30 to have sufficient adhesive characteristics such that once first portion 32a of substrate 32 is bonded to first portion 12a of transparent layer 12, first portion 32a of substrate 32 and first portion 12a of transparent layer 12 cannot be separated without damaging first portion 32a of substrate 32, and hence, collection card 10. Similarly, second portion 48b of inner surface 48 of substrate 32, has silicone 52 bonded thereto and is aligned with and positioned against the adhesive 30 bonded to second portion 24b of inner surface 24 of transparent layer 12 thereby releasably affixing second portion 32b of substrate 32 to second portion 12b of transparent layer 12. Silicone 52 or other non-binding material, e.g., wax or Teflon, prevents second portion 32b of substrate 32 from becoming permanently bonded to the adhesive layer 30. As such, it can be appreciated that silicone 52 on second portion 48b of inner surface 48 of substrate 32 allows for second portion 32b of substrate 32 to be removed from second portion 12b of transparent layer 12, for reasons hereinafter described.

Referring back to FIGS. 1 and 3, with substrate 32 bonded to transparent layer 12 as heretofore described, first edge 36 of substrate 32 and first edge 14 of transparent layer 12 define first edge 64 of collection card 10; second edge 38 of substrate 32 and second edge 16 of transparent layer 12 define second edge 66 of collection card 10; first end 42 of substrate 32 and first end 18 of transparent layer 12 define first end 68 of collection card 10; and second end 44 of substrate 32 and second end 20 of transparent layer 12 define second end 70 of collection card 10. In addition, perforated line 40 of substrate 32 is aligned with fold line 22 of transparent layer 12. As hereinafter described, it is contemplated to interconnect a plurality of collection cards, e.g., collection cards 10 and 10a in FIG. 6, in series to form a web or sheet of collection cards, generally designated by the reference numeral 78. Each collection card 10 is interconnected to an adjacent, subsequent collection card 10a along perforations 81.

In operation, a user, such as law enforcement personnel, removes collection card 10 from web or sheet of collection cards 78. Thereafter, second portion 32b of substrate 32 is removed from collection card 10 so as to expose adhesive 30 bonded to second portion 12b of transparent layer 12. Once second portion 32b of substrate 32 is separated from collection card tag 10, a piece of physical evidence 80, such as a hair or a fiber, is positioned between second portion 12b of transparent layer 12 and first portion 50a of outer surface 50 of substrate 32, FIG. 11. For example, the physical of physical evidence 80 may be positioned on adhesive 30 bonded to second portion 12b of transparent layer 12 or on first portion 50a of outer surface 50 of substrate 32. Once the piece of physical evidence 80 is positioned, as heretofore described, second portion 12b of transparent layer 12 is folded along fold line 22 over first portion 50a of outer surface 50 of substrate 32 in the direction shown by arrow 86. Once second edge 16 of transparent layer 16 is aligned with first edge 14 of transparent layer 12, second portion 12b of transparent layer 12 is brought into engagement with first portion 50a of outer surface 50 of substrate 32 such that second portion 12b of transparent layer 12 is bonded to first portion 50a of outer surface 50 of substrate 32 by adhesive 30, thereby capturing the piece of physical evidence 80 between second portion 12b of transparent layer 12 and first portion 50a of outer surface 50 of substrate 32.

Figure 11:
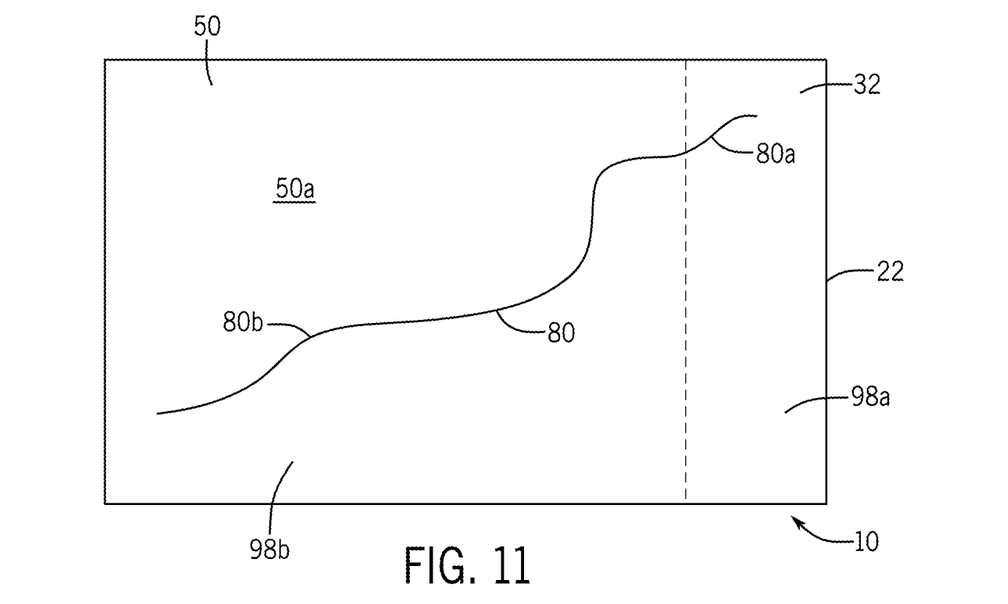
FIG. 11 is a front elevational view of the collection card of the present invention in the second configuration show a piece of physical evidence capture therein.

It can be appreciated that with the piece of physical evidence 80 captured between second portion 12b of transparent layer 12 and first portion 50a of outer surface 50 of substrate 32, the piece of physical evidence 80 is isolated from the environment external to the collection card 10, thereby minimizing degradation of the piece of physical evidence 80 due to environmental factors. Further, it is intended for the adhesive 30 to have sufficient adhesive characteristics such that once second portion 12b of transparent layer 12 is bonded to first portion 50a of outer surface 50 of substrate 32, transparent layer 12 and substrate 32 cannot be separated without damaging substrate 32, thereby allowing for the detection of the tampering and/or altering of collection card 10.

Referring to FIG. 11, once the piece of physical evidence 80 is captured between second portion 12b of transparent layer 12 and first portion 50a of outer surface 50 of substrate 32, it may be necessary for law enforcement personnel, forensic scientists and/or criminalistics to conduct an analysis/examination of the piece of physical evidence 80. In order to facilitate the analysis/examination of the piece of physical evidence 80, it can be appreciated that a first section 98a of collection card 10 including a first portion 80a of the piece of physical evidence 80 may be removed, such as with a pair of scissors or the like, for such analysis/examination. In such manner, a second portion 80b of the piece of physical evidence 80 is retained in a second section 98b of collection card 10 and isolated from the environment external to the collection card 10 for future analysis/examination, if necessary or desired.

Figure 12:
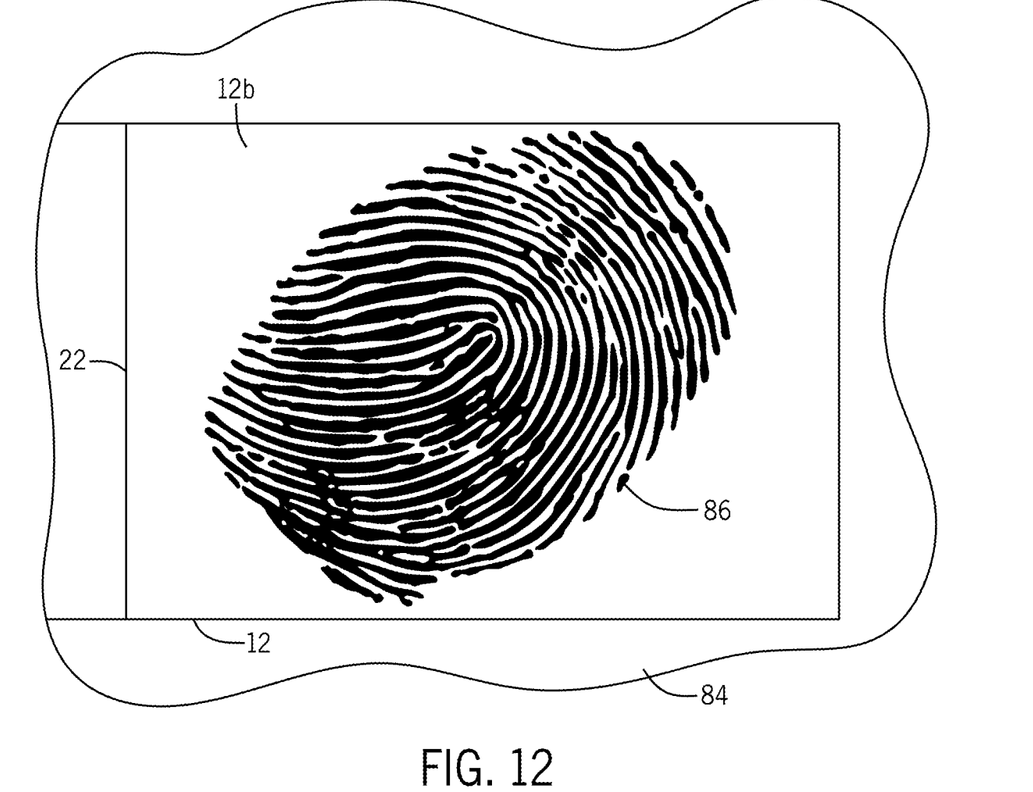
FIG. 12 is an enlarged, front elevational view of the collection card of the present invention showing the lifting of a fingerprint therewith.

Alternatively, it is contemplated to collection card 10 to lift and preserve pieces of physical evidence 80, such as fingerprints, collected at a crime scene, FIG. 12. As heretofore described, in order to collect fingerprints at a crime scene, a law enforcement professional will use a brush to dust various surfaces with a powder that sticks to the oils present in fingerprints, thereby rendering the fingerprints visible. After locating a fingerprint on a surface, the law enforcement professional will photograph the fingerprint. Thereafter, second portion 32b of substrate 32 is removed from collection card 10 so as to expose adhesive 30 bonded to second portion 12b of transparent layer 12. Once second portion 32b of substrate 32 is separated from collection card tag 10, second portion 12b of transparent layer 12 is applied to the portion of surface 84 wherein fingerprint 86 is visible such that the powder adheres to adhesive 30 on second portion 12b of transparent layer 12. Second portion 12b of transparent layer 12 is removed from surface 84 with the powder adhered thereto.

With the powder is adhered to second portion 12b of transparent layer 12, as heretofore described, second portion 12b of transparent layer 12 is folded along fold line 22 over first portion 50a of outer surface 50 of substrate 32 in the direction shown by arrow 86. Once second edge 16 of transparent layer 16 is aligned with first edge 14 of transparent layer 12, second portion 12b of transparent layer 12 is brought into engagement with first portion 50a of outer surface 50 of substrate 32 such that second portion 12b of transparent layer 12 is bonded to first portion 50a of outer surface 50 of substrate 32 by adhesive 30, thereby capturing the powder, and hence fingerprint 86, between second portion 12b of transparent layer 12 and first portion 50a of outer surface 50 of substrate 32. It is contemplated for substrate 32 to be of a color (e.g. white paper) that contrasts with color of the powder (e.g. black) to allow for fingerprint 86 to be observed and analyzed through second portion 12b of transparent layer.

It can be appreciated that with fingerprint 86 captured between second portion 12b of transparent layer 12 and first portion 50a of outer surface 50 of substrate 32, fingerprint 86 is isolated from the environment external to the collection card 10, thereby minimizing degradation of fingerprint 86 due to environmental factors. Further, it is intended for the adhesive 30 to have sufficient adhesive characteristics such that once second portion 12b of transparent layer 12 is bonded to first portion 50a of outer surface 50 of substrate 32, transparent layer 12 and substrate 32 cannot be separated without damaging substrate 32, thereby allowing for the detection of the tampering and/or altering of collection card 10.

As noted above, it is contemplated for outer surface 26 of transparent layer 12 to define a printable surface so as to allow desired information to be printed or written thereon. As such, law enforcement personnel are free to write information related to the crime scene and/or the piece of physical evidence 80 thereon. Further, it is contemplated to print any desired information on substrate 32 to facilitate tracking of the collection card 10. More specifically, a machine-readable optical label, designated by the reference number 56, such as a barcode, a matrix code, a quick response code, and a unique alphanumeric code, may be printed on first portion 48a of inner surface 48 of substrate 32 and/or on first portion 50a of outer surface 50 of substrate 32, as well as, other types of unique identifiers, such as a card number may printed on first portion 48a of inner surface 48 of substrate 32 and/or on first portion 50a of outer surface 50 of substrate 32. Machine-readable optical label 56 or other identifier allows for collection card 10 to be tracked as collection card 10 is passed between individuals and locales. By allowing collection card 10 to be tracked, law enforcement can maintain the integrity of the piece of physical evidence 80 and/or fingerprint 86, discourage the tampering and/or altering thereof and allow for facilitate law enforcement personnel to quickly and easily locate collection card 10.

Figure 13:
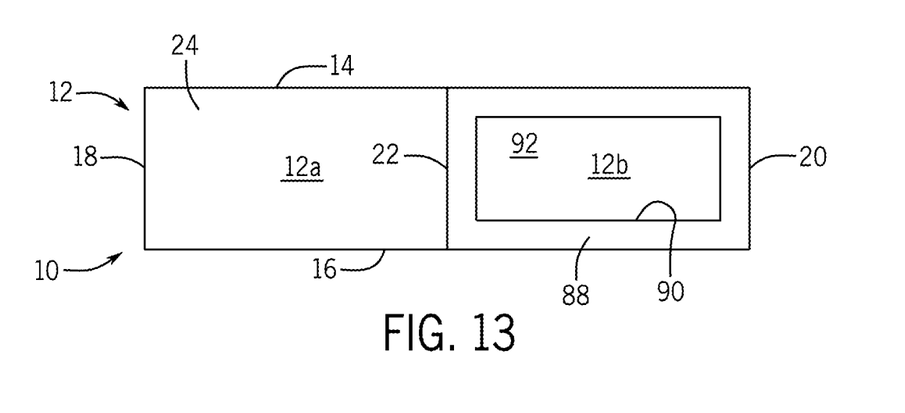
FIG. 13 is a cross-sectional view, similar of FIG. 4, showing an alternate embodiment of a collection card in accordance with the present invention.
Figure 14:
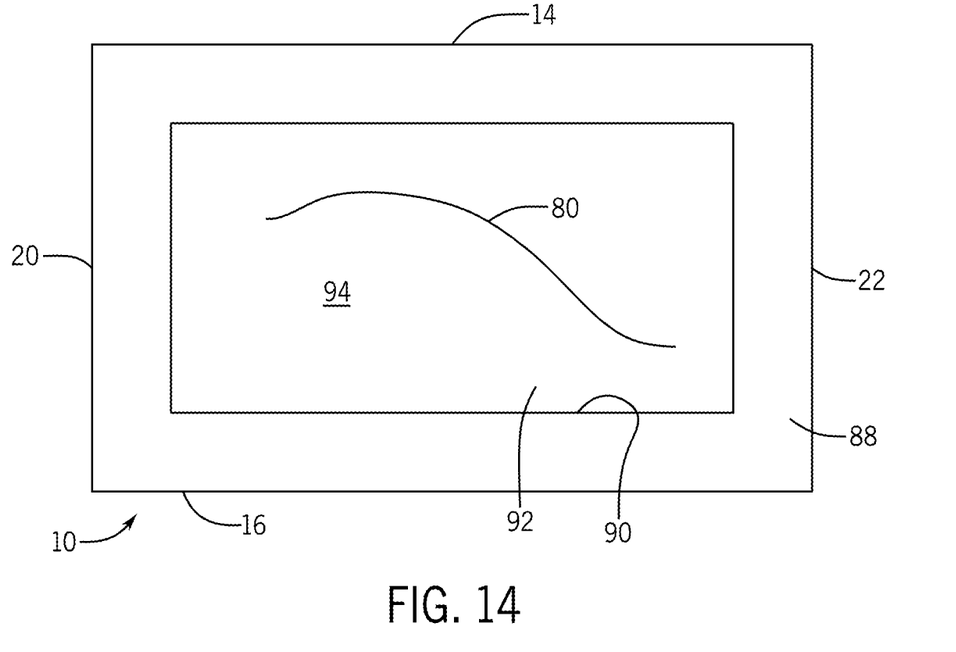
FIG. 14 is a front elevational view of the collection card of the FIG. 13 in the second configuration showing a piece of physical evidence capture therein.

Referring to FIGS. 13-14, in an alternate configuration, it is contemplated to provide adhesive 30 on selected portion 88 of second portion 24b of inner surface 24 of the transparent layer 12. More specifically, adhesive 30 is provided adjacent the outer periphery of second portion 24b of inner surface 24 of the transparent layer 12 such that has: an outer boundary defined by first and second spaced edges 14 and 16, respectively, and second end 20 of transparent layer 12 and fold line 22; and an inner boundary 90 defining an adhesive-free area 92 on second portion 24b of inner surface 24 of the transparent layer 12. It can be appreciated that with second portion 12b of transparent layer 12 folded over first portion 50a of outer surface 50 of substrate 32, as heretofore described, adhesive 30 between the inner boundary 90 and the outer boundary thereof bond second portion 12b of transparent layer 12 to first portion 50a of outer surface 50 of substrate 32. It is intended for the adhesive 30 to have sufficient adhesive characteristics such that once second portion 12b of transparent layer 12 is bonded to first portion 50a of outer surface 50 of substrate 32, transparent layer 12 and substrate 32 cannot be separated without damaging substrate 32, thereby allowing for the detection of the tampering and/or altering of collection card 10. Further, it is noted that with second portion 12b of transparent layer 12 bonded to first portion 50a of outer surface 50 of substrate 32, pocket 94 is formed in collection card 10 between adhesive-free area 92 on second portion 24b of inner surface 24 of the transparent layer 12 and first portion 50a of outer surface 50 of substrate 32.

In operation, it is understood that a piece of physical evidence 80, such a hair and/or a fiber, may be received in received and preserve in pocket 94 of collection card 10. More specifically, a user, such as law enforcement personnel, removes collection card 10 from web or sheet of collection cards 78. Thereafter, second portion 32b of substrate 32 is removed from collection card 10 so as to expose adhesive 30 bonded to second portion 12b of transparent layer 12. Once second portion 32b of substrate 32 is separated from collection card tag 10, a piece of physical evidence 80, such as a hair or a fiber, is positioned between second portion 12b of transparent layer 12 and first portion 50a of outer surface 50 of substrate 32 at a location corresponding with pocket 94. For example, the physical of physical evidence 80 may be positioned on adhesive-free area 92 on second portion 24b of inner surface 24 of the transparent layer 12 or on first portion 50a of outer surface 50 of substrate 32 aligned with adhesive-free area 92 on second portion 24b of inner surface 24 of the transparent layer 12 when collection card 10 is its folded configuration, as hereinafter described.

Once the piece of physical evidence 80 is positioned, as heretofore described, second portion 12b of transparent layer 12 is folded along fold line 22 over first portion 50a of outer surface 50 of substrate 32 in the direction shown by arrow 86. Once second edge 16 of transparent layer 16 is aligned with first edge 14 of transparent layer 12, second portion 12b of transparent layer 12 is brought into engagement with first portion 50a of outer surface 50 of substrate 32 such that second portion 12b of transparent layer 12 is bonded to first portion 50a of outer surface 50 of substrate 32 by adhesive 30, as heretofore described, thereby capturing the piece of physical evidence 80 in pocket 94.

It can be appreciated that with the piece of physical evidence 80 captured in pocket 94, the piece of physical evidence 80 is isolated from the environment external to the collection card 10, thereby minimizing degradation of the piece of physical evidence 80 due to environmental factors. As heretofore described, it is intended for the adhesive 30 to have sufficient adhesive characteristics such that once second portion 12b of transparent layer 12 is bonded to first portion 50a of outer surface 50 of substrate 32, transparent layer 12 and substrate 32 cannot be separated without damaging substrate 32, thereby allowing for the detection of the tampering and/or altering of collection card 10.

While the above description shows use of collection card 10 in connection with the gathering of physical evidence at a crime scene, it can be appreciated collection card 10 may be used in connection with the gathering, collecting and preserving of other types of specimens, such as insects, seeds, etc. without deviating from the scope of the present invention. As such, various modes of carrying out the invention are contemplated as being within the scope of the following claims particularly pointing out and distinctly claiming the subject matter, which is regarded as the invention.

I claim:

1. A method to facilitate the collecting of a unitary, non-liquid specimen and preserving one or more portions of the specimen for future analysis, the method comprising the steps of:
   providing a collection card with inner and outer layers laminated to each other;
   removing a first portion of the inner layer to expose an adhesive on a first portion of the outer layer;
   positioning the specimen on one of a surface of a second portion of the inner layer and the adhesive on the first portion of the outer layer, the surface of the second portion of the inner layer being directed away from a second portion of the outer layer;
   folding the first portion of the outer layer over the second portion of the inner layer such that the first portion of the outer layer is bonded to the second portion of the inner layer by the adhesive, the specimen is affixed to the adhesive, and an entirety of the specimen is captured between the adhesive on the first portion of the outer layer and the surface of the second portion of the inner layer;
   separating the first portion of the outer layer from the second portion of the inner layer bonded thereto causes damage to the second portion of the inner layer in order to indicate tampering with the collection card;
   disconnecting a first portion of the collection card from a second portion of the collection card so as to disconnect a first portion of the specimen from a second portion of the specimen, the first portion of the collection card including a first portion of the specimen captured between the adhesive on the first portion of the outer layer and the surface of the second portion of the inner layer such that the first portion of the specimen remains affixed to the adhesive and the first portion of the specimen is isolated from an environment external to the first portion of the collection card;
   removing the first portion of the specimen from the first portion of the collection card for analysis; and
   retaining the second portion of the collection card including the second portion of the specimen captured between the adhesive on the first portion of the outer layer and the surface of the second portion of the inner layer such that the second portion of the specimen remains affixed to the adhesive and the second portion of the specimen is isolated from an environment external to the second portion of the collection card and thereby preserving the second portion of the specimen for future analysis.

2. The method of claim 1 wherein the second portion of the inner layer is bound to the second portion of the outer layer by the adhesive.

3. The method of claim 1 wherein the first portion of the inner layer has a non-binding layer of material affixed thereto.

4. The method of claim 3 wherein the material is one of silicone and wax.

5. A method to facilitate the collecting and preserving a non-liquid specimen, the method comprising the steps of:
   providing a collection card with inner and outer layers laminated to each other, the inner layer having first and second portions;
   printing a unique machine-readable optical label on the second portion of the inner layer;
   removing the first portion of the inner layer to expose an adhesive on a first portion of the outer layer;
   positioning the specimen between a surface of the second portion of the inner layer and the adhesive on the first portion of the outer layer, the surface of the second portion of the inner layer being directed away from a second portion of the outer layer;
   folding the first portion of the outer layer over the second portion of the inner layer such that the first portion of the outer layer is bonded to the second portion of the inner layer by the adhesive, the specimen is affixed to the adhesive on the first portion of the outer layer at a location spaced from an outer periphery of the outer layer, and the specimen is captured between the adhesive on the first portion of the outer layer, and the surface of the second portion of the inner layer;
   separating the outer periphery of the first portion of the outer layer from the second portion of the inner layer bonded thereto causes damage to the second portion of the inner layer in order to indicate tampering with the collection card; and tracking a location of the collection card utilizing the unique machine-readable optical label;
wherein the step of positioning the specimen between the second portion of the inner layer and the first portion of the outer layer includes the additional steps of:
- affixing the first portion of the outer layer to a surface over a powder adhered to a fingerprint on the surface such that the powder adheres to the first portion of the outer layer; and
- removing the first portion of the outer layer from the surface with the powder adhered thereto.

6. A method to facilitate the collecting of a unitary non-liquid specimen and preserving one or more portions of the specimen for future analysis, the method comprising the steps of:
- providing a collection card moveable between a first configuration wherein the collection card is generally flat and a second configuration, the collection card having inner and outer layers laminated to each other;
- removing a first portion of the inner layer to expose an adhesive on at least a portion of a first portion of the outer layer;
- positioning the specimen between a surface of a second portion of the inner layer and the first portion of the outer layer, the surface of the second portion of the inner layer being directed away from a second portion of the outer layer;
- folding the collection card to the second configuration wherein first portion of the outer layer is affixed to the second portion of the inner layer such that the specimen is affixed to the adhesive and the specimen is captured between the first portion of the outer layer and the surface of the second portion of the inner layer;
- separating the first portion of the outer layer from the second portion of the inner layer affixed thereto causes damage to the second portion of the inner layer in order to indicate tampering with the collection card;
- disconnecting a first portion of the collection card from a second portion of the collection card so as to disconnect a first portion of the specimen from a second portion of the specimen, the first portion of the collection card including a first portion of the specimen captured between the first portion of the outer layer and the second portion of the inner layer such that the first portion of the specimen remains affixed to the adhesive and the first portion of the specimen is isolated from an environment external to the first portion of the collection card;
- removing the first portion of the specimen from the first portion of the collection card for analysis; and
- retaining the second portion of the specimen captured between the first portion of the outer layer and the surface of the second portion of the inner layer in the second portion of the collection card such that the second portion of the specimen remains affixed to the adhesive and the second portion of the specimen is isolated from an environment external to the second portion of the collection card and thereby preserving the second portion of the specimen for future analysis.

7. The method of claim 6 wherein the second portion of the inner layer is bound to the second portion of the outer layer by the adhesive.

8. The method of claim 6 wherein the first portion of the inner layer has a non-binding layer of material affixed thereto.

9. The method of claim 8 wherein the material is one of silicone and wax.

10. A method to facilitate the collecting and preserving a non-liquid specimen, the method comprising the steps of:
- providing a collection card moveable between a first configuration wherein the collection card is generally flat and a second configuration, the collection card having inner and outer layers laminated to each other and the inner layer having first and second portions;
- printing a unique machine-readable optical label on the second portion of the inner layer;
- removing the first portion of the inner layer to expose an adhesive on at least a portion of a first portion of the outer layer;
- positioning the specimen between a surface of the second portion of the inner layer and the first portion of the outer layer, the surface of the second portion of the inner layer being directed away from a second portion of the outer layer;
- folding the collection card to the second configuration wherein the first portion of the outer layer is adjacent the second portion of the inner layer such that the first portion of the outer layer is affixed to the second portion of the inner layer by the adhesive, the specimen is affixed to the adhesive on the first portion of the outer layer at a location spaced from an outer periphery of the outer layer, and the specimen is captured between the first portion of the outer layer and the surface of the second portion of the inner layer;
- separating the outer periphery of the first portion of the outer layer from the second portion of the inner layer affixed thereto causes damage to the second portion of the inner layer in order to indicate tampering with the collection card; and
- tracking a location of the collection card utilizing the unique machine-readable optical label;
wherein the step of positioning the specimen between the second portion of the inner layer and the first portion of the outer layer includes the additional steps of:
- affixing the first portion of the outer layer to a surface over a powder adhered to a fingerprint on the surface such that the powder adheres to the first portion of the outer layer; and
- removing the first portion of the outer layer from the surface with the powder adhered thereto.

11. A method to facilitate the collecting, preserving and analyzing a non-liquid piece of physical evidence, the piece of physical evidence having an initial unitary configuration, the method comprising the steps of:
- providing a collection card with inner and outer layers laminated to each other;
- removing a first portion of the inner layer of the collection card to expose a first portion of the outer layer;
- providing an adhesive on the first portion of the outer layer;
- positioning the piece of physical evidence between a surface of a second portion of the inner layer and the first portion of the outer layer, the surface of the second portion of the inner layer being directed away from a second portion of the outer layer;
- capturing the piece of physical evidence between the surface of the second portion of the inner layer and the first portion of the outer layer such that the first portion of the outer layer is bonded to the second portion of the inner layer by the adhesive and the piece of physical evidence is bound to the adhesive on the first portion of the outer layer;
- separating the first portion of the outer layer from the second portion of the inner layer bonded thereto causes damage to the second portion of the inner layer in order to indicate tampering with the collection card;

disconnecting at least a first portion of the piece of physical evidence from a second portion of the piece of physical specimen such that the first portion of the specimen remains affixed to the adhesive in a first portion of the collection card and the first portion of the specimen is isolated from an environment external to the first portion of the collection card;

removing the first portion of the specimen from the first portion of the collection card for analysis;

retaining the second portion of the piece of physical evidence in a second portion of the collection card such that the second portion of the specimen remains affixed to the adhesive; and when the second portion of the piece of physical evidence is retained in the second portion of the collection card between the first portion of the outer layer and the surface of the second portion of the inner layer, performing the additional step of maintaining the second portion of the piece of physical evidence within an environment isolated from an environment external to the second portion of the collection card.

12. The method of claim 11 further comprising the step of:

affixing a non-binding layer of material to the inner surface of the second portion of the inner layer.

13. The method of claim 12 wherein the material is one of silicone and wax.

* * * * *